United States Patent

Smirmaul

[15] 3,641,808
[45] Feb. 15, 1972

[54] VORTEX GENERATING SENSOR WITH SECONDARY FLOW

[72] Inventor: Heinz J. Smirmaul, Painted Post, N.Y.
[73] Assignee: Corning Glass Works, Corning, N.Y.
[22] Filed: June 1, 1970
[21] Appl. No.: 41,786

[52] U.S. Cl. ..................................................73/37.5
[51] Int. Cl. ..................................................G01b 13/12
[58] Field of Search ...............73/37.5–37.7, 505, 73/194 C; 137/81.5

[56] References Cited

UNITED STATES PATENTS

| | | | |
|---|---|---|---|
| 3,481,180 | 12/1969 | Jones | 73/37.5 |
| 3,324,891 | 6/1967 | Rhoades | 137/81.5 X |
| 3,417,624 | 12/1968 | Bowles et al. | 73/505 X |
| 3,545,256 | 12/1970 | Beeken | 73/37.5 |

Primary Examiner—Louis R. Prince
Assistant Examiner—William A. Henry, II
Attorney—Clarence R. Patty, Jr. and Walter S. Zebrowski

[57] ABSTRACT

A vortex generating sensor for detecting and indicating the presence of an object in the path of a stream of fluid comprising a cylindrical vortex generating chamber, a supply port for introducing fluid into the vortex chamber, a vortex outlet port communicating with a central portion of the vortex chamber for permitting the fluid to be exhausted therefrom, a vortex direction chamber communicating with said generating chamber through said outlet port for affecting the configuration of the exhausted fluid, at least one secondary fluid flow port communicating with said direction chamber, and a sensing port by means of which the pressure within the central portion of the vortex chamber is sensed.

11 Claims, 4 Drawing Figures

PATENTED FEB 15 1972                                3,641,808

INVENTOR.
Heinz J. Smirmaul
BY
Walter S. Zebrowski
ATTORNEY

VORTEX GENERATING SENSOR WITH SECONDARY FLOW

BACKGROUND OF THE INVENTION

The present invention relates specifically to a vortex generating sensor which is responsive to the presence of an object in the path of a stream of fluid when the object is sufficiently close to the outlet of the issuing stream of fluid. It has been found that in operating a vortex generating sensor having a direction chamber, the fluid exhausted from the vortex chamber causes an oscillating attachment of the vortex cone to the direction chamber wall resulting in a noisy operation of the vortex generating sensor.

An object of the present invention is to provide a means for preventing attachment of the exhausted vortex fluid to the direction chamber wall.

Another object of the present invention is to provide an efficient and economical noncontacting sensor for detecting or indicating the presence of an object or article, and for determining the position of such an object or article.

SUMMARY OF THE INVENTION

Briefly, in accordance with the present invention a quiet vortex generating sensor is provided for detecting and/or indicating the presence of an object in the path of a stream of fluid and for determining the distance of such an object from the sensor outlet. Said sensor comprises a substantially cylindrical vortex generating chamber defined by a substantially cylindrical wall and two substantially flat ends, with means being provided for introducing a fluid into the vortex chamber. A vortex outlet port in one of the flat ends communicates with a central portion of the vortex chamber for permitting the fluid to be exhausted or emitted from the vortex chamber. A direction chamber communicating with the generating chamber through the outlet port is provided for affecting the configuration of the fluid exhausted through the outlet port. Means communicating with the direction chamber for substantially tangentially introducing a secondary fluid flow into the direction chamber in substantially the same peripheral direction as that of the exhausted fluid are also provided. Means are included for sensing the pressure within the central portion of the vortex chamber. A decrease of the pressure in the central portion of the vortex chamber indicates the presence of an object in the path of the issuing fluid, said pressure being a function of the distance of the object from the sensor.

Additional objects, features, and advantages of the present invention will become apparent to those skilled in the art from the following detailed description and the attached drawing on which, by way of example, only the preferred embodiments of this invention are illustrated.

DESCRIPTION OF THE PREFERRED EMBODIMENTS

The fluid suitable for the purpose of the present invention may be compressible such as air, nitrogen, or other gases, or incompressible such as water or other liquids. Both compressible and incompressible fluids may contain solid material. This invention is not limited to any particular fluid.

Figure 1:
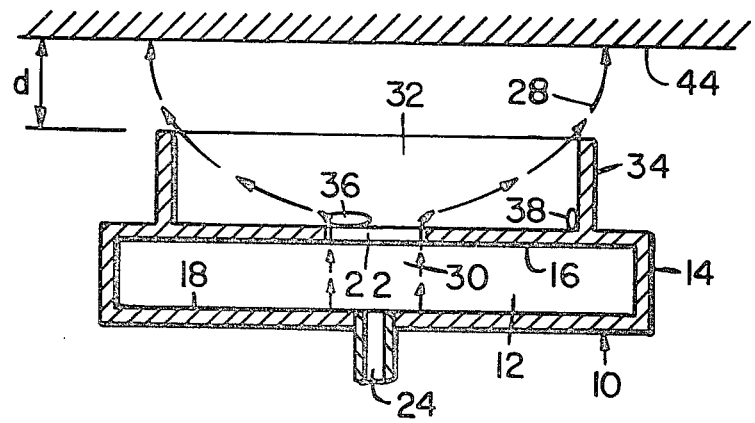
FIG. 1 shows a cross-sectional elevation of a sensor illustrating the present invention.
Figure 2:
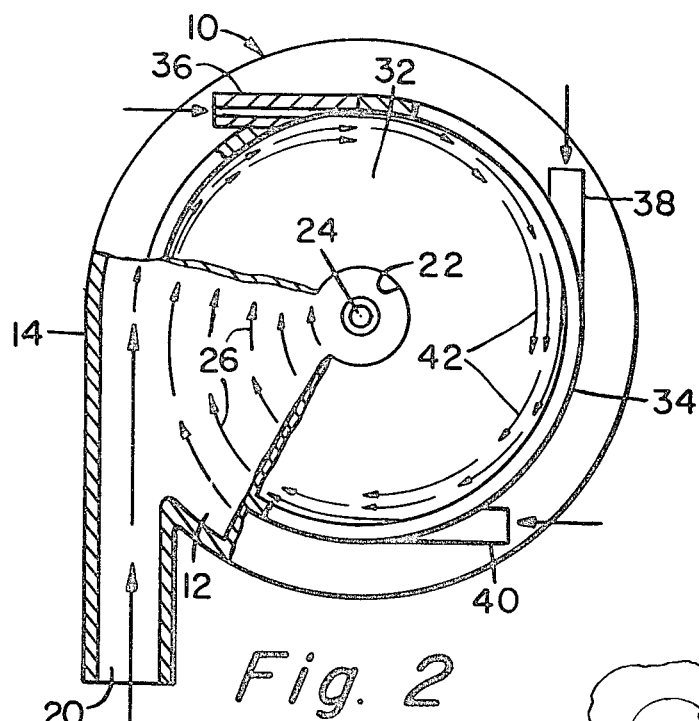
FIG. 2 shows a plan view, partly in section, of the sensor of FIG. 1.

Referring to FIG. 1, a fluid operated vortex generating sensor or device 10 is illustrated comprising a vortex generating chamber 12 of substantially cylindrical shape defined by a substantially cylindrical peripheral defining wall 14, and substantially flat end members 16 and 18. Referring additionally to FIG. 2, there is seen that sensor 10 also includes a fluid supply port 20 through which fluid from a suitable source, not shown, flows into vortex chamber 12. A sensor outlet port 22 is formed through end member 16, through which port the vortex fluid is exhausted or emitted. Port 22 is formed or disposed substantially along the longitudinal axis of sensor 10. A pressure sensing port 24 communicates through member 18 with the central portion of chamber 12 to provide means through which pressure therein can be sensed or detected. The central portion of chamber 12 is defined by the periphery of outlet port 22.

Pressure sensing port 24 is connected to a suitable pressure sensing or utilization device, not shown, which device may be any logic component such as an OR/NOR gate, a Schmitt trigger, a fluid switch, or other suitable pressure sensitive device.

Fluid supply port 20 is connected to chamber 12 in a tangential manner so that fluid enters through fluid supply port 20 about the periphery of chamber 12. The inner surface of peripheral defining wall 14 causes a smooth circular flow pattern of the fluid as generally indicated by the outer arrows in FIG. 2. After substantially one revolution around wall 14, the fluid flows in a spiral flow pattern 26 with continuously increasing velocity, characteristic of a vortex pattern, until it reaches the central portion of chamber 12. The fluid acquires a component of force normal to the path of flow pattern 26 and, when it reaches the periphery of outlet port 22, the fluid is emitted or escapes from sensor 10 through outlet port 22 substantially about the periphery thereof to form an output fluid envelope 28, as generally represented in FIG. 1 by a series of arrows, which fluid envelope in part defines vortex funnel 30.

The present invention also includes a substantially cylindrical direction chamber 32 defined by peripheral defining wall 34. The purpose of direction chamber 32 is to provide means for shaping or configuring the vortex fluid envelope 28 issuing from chamber 12. For example, by employing direction chamber 32, envelope 28 can be shaped to maintain definition at a greater distance from the sensor than would otherwise be possible.

Figure 3:
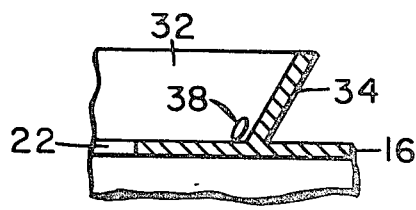
FIG. 3 shows a fragmentary cross-sectional elevation of a sensor illustrating another embodiment of the present invention.

Although direction chamber peripheral defining wall 34 is shown intermediate sensor outlet port 22 and the vortex generating chamber defining wall 14, it may be formed at any point extending from the edge of sensor outlet port 22 to a point coincident with peripheral defining wall 14. In addition, although peripheral defining wall 34 has been illustrated substantially parallel to the longitudinal axis of the sensor, such walls may be shaped otherwise, as for example, wall 34 may be curved or tapered as illustrated in FIG. 3.

It should be noted that the opening of direction chamber 32 and the opening defined by outlet port 22 should be at least slightly larger in area and diameter than is the opening defined by sensing port 24. This relationship is necessary to insure that the vortex fluid is exhausted or emitted entirely through the outlet port and avoids losses that could otherwise occur if a portion of the fluid were to issue through the sensing port. In addition, the fluid pressure in the sensing port would be affected if such relationship did not exist. It has been found, however, that the noncontacting sensor of the present invention is operative, although at low efficiency, when the outlet port and the sensing port have the same areas and diameters.

Means, such for example as ports 36, 38, and 40 shown in FIGS. 1 and 2, are provided for introducing a secondary fluid flow into the direction chamber. Such ports may be spaced about the periphery in any number and manner, such for example, as 4 ports at approximately 90° apart. Ports 36, 38, and 40 introduce secondary fluid substantially tangentially to the inner surface of defining wall 34 and provide a spiralled secondary fluid flow 42 as illustrated by the series of arrows within direction chamber 32 in FIG. 2. This secondary fluid flow at least in part combines with the output fluid forming envelope 28 and provides a buffer layer between envelope 28 and wall 34 having a pressure so as to prevent the fluid of envelope 28 from locking-on or attaching to wall 34.

The operation of the vortex generating sensor of the present invention is illustrated by the following typical example. Air from a suitable source, not shown, is transmitted through fluid supply port 20 and tangentially enters vortex generating chamber 12 at the periphery thereof along the inner surface of defining wall 14. The ambient fluid medium is also air. The fluid entering vortex chamber 12 is caused to flow in a spiral pattern with continuously increasing velocity until it reaches the periphery of outlet port 22. The fluid having acquired a component of force normal to the path of the fluid flow is emitted through sensor outlet port 22 into direction chamber 32 whereupon it forms output fluid envelope 28. With no obstruction of envelope 28 by any object or article, open ended envelope 28 is free to entrain a relatively large quantity of ambient air into vortex funnel 30 so that the pressure as detected at sensing port 24 is relatively close to that of ambient, although perhaps slightly less. The pressure in the vortex funnel is detected at sensing port 24 by any suitable sensing or utilization device, not shown, heretofore described.

When an object of any description, such for example, as flat member 44, is brought in close proximity to sensor 10 as shown, entrainment of ambient air into the vortex funnel is at least in part obstructed. The effect of such an obstruction is to reduce the fluid pressure within funnel 30 by an amount easily detectable at sensing port 24. The reduction in pressure occurs since the obstructing object prevents entrainment of as much ambient air as would otherwise be entrained into funnel 30 whereby the pressure difference between funnel 30 and ambient cannot be lowered to the same extent as would occur without the obstructing object being present. Accordingly, a partial vacuum is drawn against member 44, the value of which is measurable at sensing port 24. Such operation, however, causes the fluid of envelope 28 to result in an oscillating attachment thereof to the direction chamber wall 34. Air is then introduced through secondary fluid ports 36, 38, and 40 to provide a secondary fluid flow forming a buffer layer between envelope 28 and wall 34 reducing or eliminating the attachment between the two and providing substantially less noisy operation of the sensor. Such secondary fluid flow tends to stabilize pressure variations within funnel 30 caused by said oscillating attachment.

When the stream of fluid emitting from direction chamber 32 is directed against an object, such as member 44, the pressure sensed at port 24 increases as the distance $d$ between the end of direction chamber defining wall 34 and member 44 increases. This is seen by the fact that more ambient air may be entrained within funnel 30 thereby increasing the pressure as distance $d$ increases.

Figure 4:
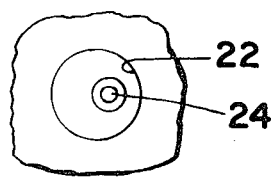
FIG. 4 shows a fragmentary plan view of a sensor illustrating another embodiment of the present invention.

When it is desired to increase the absolute pressure sensed at port 24 to, for example, match the requirements of some sensing or utilization device, such pressure increase can be obtained by moving port 24 closer to the peripheral edge of the sensor outlet port 22 and vortex funnel 30. In such manner the pressure sensed will increase for a given distance $d$. This comes about since the lowest pressure within the vortex funnel is at the center and the pressure increases along a radial therefrom to the outlet periphery. The eccentric location of such sensing port 24 with respect to outlet port 22 is illustrated in FIG. 4.

Although the present invention has been described with respect to specific details of certain embodiments thereof, it is not intended that such details be limitations on the preset invention except insofar as set forth in the following claims.

I claim:
1. A vortex generating sensor comprising
  a substantially cylindrical vortex generating chamber defined by a wall having a substantially cylindrical inner surface and two substantially flat ends,
  a source of driving fluid,
  means connected to said source for substantially tangentially introducing said fluid into said generating chamber at the periphery thereof,
  means communicating with a central portion of said generating chamber through one of said flat ends for exhausting said fluid from said generating chamber,
  direction chamber communicating with said generating chamber through said exhausting means for affecting the configuration of the fluid exhausted from said generating chamber,
  means communicating with said direction chamber for substantially tangentially introducing a secondary fluid flow into said direction chamber in substantially the same peripheral direction as that of said exhausted fluid, said secondary fluid combining at least in part with said exhausted fluid, and
  means for sensing the pressure within said central portion of said generating chamber, a decrease of said pressure indicating the presence of an object in the path of said stream, said pressure being a function of the distance of said object from said direction chamber.

2. The sensor of claim 1 wherein the means for exhausting comprises a vortex outlet port formed in one of said flat ends substantially along the longitudinal axis of said sensor.

3. The sensor of claim 2 wherein said sensing means comprises a pressure sensing port formed in said other of said flat ends, said port communicating with said central portion of said generating chamber eccentrically in relation to said outlet port.

4. The sensor of claim 2 wherein said sensing means comprises a pressure sensing port formed in the other of said flat ends, said port communicating with said central portion of said generating chamber substantially along the longitudinal axis of said outlet port.

5. The sensor of claim 4 wherein the diameter of said outlet port is larger than the diameter of said sensing port.

6. The sensor of claim 1 wherein said introducing means comprises a fluid supply port disposed to direct said fluid into said vortex generating chamber along the peripheral defining wall thereof.

7. The sensor of claim 1 wherein said means for introducing a secondary fluid flow comprises at least one fluid supply port connected to said direction chamber.

8. The sensor of claim 7 wherein said means for introducing a secondary fluid flow comprises four fluid supply ports connected to said direction chamber and spaced approximately 90° apart.

9. The sensor of claim 1 further comprising a utilization device connected to said sensing means.

10. The sensor of claim 1 wherein the means for exhausting comprises a vortex outlet port formed in one of said flat ends substantially along the longitudinal axis of said sensor, wherein said sensing means comprises a pressure sensing port formed in the other of said flat ends communicating with said central portion of said generating chamber substantially along the longitudinal axis of said outlet port, the diameter of said outlet port being larger than the diameter of said sensing port, wherein said means for introducing said fluid into said generating chamber comprises a fluid supply port disposed to direct said fluid into said vortex generating chamber along the peripheral wall thereof, and wherein said means for introducing a secondary fluid flow comprises at least one fluid supply port connected to said direction chamber, further comprising a utilization device connected to said pressure sensing port.

11. The sensor of claim 1 wherein the means for exhausting comprises a vortex outlet port formed in one of said flat ends substantially along the longitudinal axis of said sensor, wherein said sensing means comprises a pressure sensing port formed in the other of said flat ends communicating with said central portion of said generating chamber eccentrically in relation to said outlet port, the diameter of said outlet port being larger than the diameter of said sensing port, wherein said means for introducing said fluid into said generating chamber comprises a fluid supply port disposed to direct said fluid into said vortex generating chamber along the peripheral wall thereof, and wherein said means for introducing a secondary fluid flow comprises at least one fluid supply port connected to said direction chamber, further comprising a utilization device connected to said pressure sensing port.

* * * * *